(12) United States Patent
Lee

(10) Patent No.: US 11,834,010 B2
(45) Date of Patent: Dec. 5, 2023

(54) WINDSHIELD WIPER BLADE ADAPTER

(71) Applicant: ALBEREE PRODUCTS, INC., Halethrope, MD (US)

(72) Inventor: Albert Lee, Baltimore, MD (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 151 days.

(21) Appl. No.: 17/420,815

(22) PCT Filed: Jan. 7, 2020

(86) PCT No.: PCT/US2020/012575
§ 371 (c)(1),
(2) Date: Jul. 6, 2021

(87) PCT Pub. No.: WO2020/146382
PCT Pub. Date: Jul. 16, 2020

(65) Prior Publication Data
US 2022/0118947 A1    Apr. 21, 2022

Related U.S. Application Data

(60) Provisional application No. 62/789,273, filed on Jan. 7, 2019.

(51) Int. Cl.
*B60S 1/40*          (2006.01)
(52) U.S. Cl.
CPC ........... *B60S 1/4016* (2013.01); *B60S 1/4067* (2013.01); *B60S 2001/4012* (2013.01); *B60S 2001/4022* (2013.01)

(58) Field of Classification Search
CPC ..... B60S 1/4003; B60S 1/4025; B60S 1/4077
See application file for complete search history.

(56) References Cited

U.S. PATENT DOCUMENTS

| 8,615,841 | B2* | 12/2013 | Kim ...................... | B60S 1/4006 |
| | | | | 15/250.32 |
| 9,555,775 | B2* | 1/2017 | Fournier ............... | B60S 1/4077 |
| 10,093,282 | B2* | 10/2018 | Hyun ................... | B60S 1/4016 |
| 10,166,951 | B2* | 1/2019 | Kawashima .......... | B60S 1/4006 |
| 2003/0066153 | A1* | 4/2003 | Rosenstein ........... | B60S 1/4003 |
| | | | | 15/250.32 |
| 2004/0123414 | A1* | 7/2004 | Lee ....................... | B60S 1/4019 |
| | | | | 15/250.32 |
| 2006/0230571 | A1 | 10/2006 | Son | |

(Continued)

FOREIGN PATENT DOCUMENTS

FR       2 600 291 A1    12/1987
JP       63-145752 U    9/1988
(Continued)

*Primary Examiner* — Michael D Jennings
(74) *Attorney, Agent, or Firm* — Birch, Stewart, Kolasch & Birch, LLP

(57) ABSTRACT

The present invention is directed to a wiper blade adapter (200) having a body (100) for receiving a hook-type wiper arm (300) and an adapter cap (1) for locking the hook-type wiper arm (300) to the adapter (200), a first end of the adapter cap (1) is hingedly connected to a body pin (130) of the body (100), and a second end of the adapter cap (1) engages a groove (112, 122) of the body (100) to lock the adapter cap (1) to the body (100) and to the hook-type wiper arm (300).

19 Claims, 6 Drawing Sheets

(56) References Cited

U.S. PATENT DOCUMENTS

| | | | |
|---|---|---|---|
| 2011/0113583 A1 | 5/2011 | Shanmugham et al. | |
| 2012/0090125 A1 | 4/2012 | Uchiyama et al. | |
| 2013/0152324 A1 | 6/2013 | Lee et al. | |
| 2014/0123426 A1 | 6/2014 | Lee | |
| 2014/0201938 A1* | 7/2014 | Park | B60S 1/38 15/250.48 |
| 2015/0033494 A1 | 2/2015 | Thielen et al. | |
| 2015/0135464 A1* | 5/2015 | Benner | B60S 1/4006 15/250.32 |
| 2015/0183401 A1 | 7/2015 | Kim et al. | |
| 2015/0258967 A1* | 9/2015 | Lepper | B60S 1/4003 15/250.32 |
| 2017/0043749 A1* | 2/2017 | Hyun | B60S 1/4016 |
| 2017/0072911 A1 | 3/2017 | Piotrowski et al. | |
| 2017/0129461 A1* | 5/2017 | Fournier | B60S 1/387 |

FOREIGN PATENT DOCUMENTS

| | | |
|---|---|---|
| JP | 2000-255387 A | 9/2000 |
| JP | 2001-163188 A | 6/2001 |
| JP | 2001-260823 A | 9/2001 |
| JP | 2012-81926 A | 4/2012 |
| KR | 10-1013985 B1 | 2/2011 |

\* cited by examiner

WINDSHIELD WIPER BLADE ADAPTER

CROSS-REFERENCE TO RELATED APPLICATIONS

This application is the National Phase of PCT International Application No. PCT/US2020/012575, filed on Jan. 7, 2020, which claims priority under 35 U.S.C. 119(e) to U.S. Provisional Application No. 62/789,273, filed on Jan. 7, 2019, all of which are hereby expressly incorporated by reference into the present application.

BACKGROUND OF THE INVENTION

Field of the Invention

Embodiments of the invention are directed generally to windshield wiper blade hook arm adapter for connecting a wiper blade assembly to a wiper arm.

Description of the Related Art

Wiper arms may have hooks, pins, or other configurations to connect to a wiper blade. Existing attachment structures include adapters that are complex to manufacture.

SUMMARY OF THE INVENTION

An embodiment of the invention is directed to an improved wiper blade adapter including a cap hingedly connected a body, the cap including a spring and a locking bar.

The adapter of the present invention may be used on any type of wiper hook arm, including being used to connect a 9×3 mm and a 9×4 mm automotive wiper hook arm to a wiper blade, and allowing the wiper blades to rotate on the wiper hook arm.

The present invention provides an improved locking design of an adapter to a wiper arm, the adapter including an adapter cap having a spring and a locking bar and a body including grooves for receiving the locking bar.

During assembly, the spring compresses, allowing the locking bar to follow the grooves to hold the cap in place and to hold the wiper arm in place, thereby preventing the wiper arm from disengaging during use.

During the disassembly, the spring acts as an extension spring that stretches to allow the locking bar to follow the grooves upward to release the cap from its locking position.

The hook arm adapter may include a body and a cap, the body and cap may be separate from one another and may be hingedly connected to one another, such that the cap is movable with respect to the body.

The body may include a pair of slots disposed in a lower portion thereof, a first slot of the pair of slots may be for rotatably mounting the adapter to a transverse pin of a bridge member of a blade unit, as known in the art, and a second slot of the pair of slots may be for rotatably receiving a rolled bushing of a pin type wiper arm. The pair of slots may be provided substantially at a center of the hook arm adapter, and the pair of slots may be defined by a protrusion (i.e., a connector or central bridge) provided therebetween, the protrusion extends downwardly and separates the slots from one another.

The pair of slots is described in the wiper blade connector of U.S. Pat. No. 6,640,380 B2, herein "Rosenstein" and U.S. Pat. No. 10,166,951 B2, herein "Kawashima," both of which are incorporated by reference in their entirety.

Rosenstein discloses "[a] rivet passage 28 (FIG. 2) extends through the side walls and central bridge to receive a wiper blade pivot pin, such as rivet 30 (FIG. 1), for coupling the connector 16 to the blade 14 . . . [and] [a] pin passage 32 extends through the side walls to receive the one-quarter and three-sixteenths inch wiper arm pins 12a and 12b . . . [and] [a] central bridge 26 separates the side wall and includes a generally arcuate clip 34 (FIG. 2) positioned rearward of the rivet passage" (Rosenstein column 3, line 67-column 4, line 8).

Kawashima discloses the following in column 6, line 55-column 7, line 5: "On an underside of the connector 100, opposite of the upper side having channel 108, is a first passage or rivet channel 120 and a second passage or pin channel 122. Passages 120, 122 extend through first and second walls 102, 104 and are defined for fittably receiving and holding a rod, pin, or other elongate cylindrical member in a snap-fit. For instance, a rod or rivet provided on a connecting base of wiper blade 10 may be received within passage 120, while a pin from a pin-type wiper arm may be receivable within passage 122. Either first or second passage 120, 122 may include one or more clips 124 which further define the associated passage and may communicate with a rod or pin received in the passage in order to securely hold the rod or pin within the passage. In the illustrated embodiment, clip 124 includes an upper channel portion 126, a resilient clip end 128 defining one side of first passage 122, and passage divider 130 mutually defining the second side of the first passage 122, as well as a first side of the second passage 124."

The cap of the present invention may include a substantially circular shaped cap groove at a first end thereof and a spring at a second end thereof. The spring is elastic and may have a wavy shape, which may include an S-shape. Further, the spring may have a substantially oval shaped locking bar at an end of the spring. The locking bar may have a greater width than a width of the spring. Further, the locking bar may have any shape, including having a circular cross-section, a rectangular cross-section and a semi-circular cross-section. Further, the spring may include a convex portion extending downwardly from the cap and a concave portion extending from the convex portion, and the locking bar being provided at an end of the convex portion.

The body further may further comprise two opposing side walls a first end thereof, each opposing side wall including hole for receiving a wiper arm having a pin arm and a side wall groove for receiving the locking bar of the spring. For example, the hole for receiving a wiper arm having a pin arm is illustrated in FIG. 9A of U.S. Pat. No. 9,511,748, herein "Piotrowski," which is incorporated by reference in its entirety. Piotrowski discloses a pin arm 204 of a wiper arm 200 engaging a recess 114 of the connector 102 (Piotrowski column 4, lines 26-39 and column 5, lines 3-7).

When the cap is in its closed position against the hook arm adapter body, the concave portion of the spring surrounds the hole of the body for receiving a wiper arm. That is, the spring has the concave portion so as not to block the hole of the body for receive the wiper arm.

Further, the body includes a body pin extending between the two opposing side walls for receiving the cap groove. The opposing side walls may define a channel for receiving a hook portion of a hook-type wiper arm.

The cap groove may have a smaller opening than the body pin, such that an elastic force is necessary to attach the cap groove to the body pin. Once the cap and the body are attached via the connection of the cap groove to the body pin, the cap and the body are movable with respect to one another. For instance, the cap groove may be slightly larger than the body pin to allow for relative movement between the cap and the body.

The side wall grooves of the body are provided at an upper surface of the opposing side walls and may have an L-shape. For instance, each side wall groove may extend from a respective top surface in a first direction to a first end thereof, the first direction may be in a substantially downward direction, and may extend from the first end to a second end in a second direction, the second direction may be substantially perpendicular to the first direction. Further, the second direction may be directed substantially towards the body pin.

However, the side wall grooves may have any shape so as to retain the locking bar of the cap. The side wall grooves of the body may be slightly wider than the locking bar to allow the locking bar to be received therein. In other words, the side wall grooves of the body may be sized to receive the locking bar and may have any shape.

The spring of the cap may extend from the second end of the side wall grooves towards the first end of the side wall grooves in the wavy shape for engaging the side wall grooves. Once the locking bar is attached to the side wall grooves, the spring is positioned substantially between the opposing side walls of the body. However, the spring may be biased towards any one of the two opposing side walls.

A top surface of the cap may include a first portion and a second portion, the first portion may have a width smaller than a width of the second portion. The first portion may extend from the first end of the cap to a longitudinal position substantially above the locking bar. Further, the second portion may extend from the second end of the cap to the longitudinal position substantially above the locking bar. Further, the second portion of the top surface of the cap may extend from the first portion to the second end of the cap.

The second portion of the top surface of the cap may have a width substantially the same as a width defined by the two opposing side walls, such that once the cap is installed on the body, the second portion of the cap is flush with the opposing side walls. In other words, once the cap is installed on the body, the cap does not extend outwardly, in a width direction, from the opposing side walls. Further, once the cap is installed on the body, the first portion may be provided in between the opposing side walls. However, the cap may be sized to extend outwardly, in a width direction, of the opposing side walls.

Once the cap groove is attached to the body pin, the cap is movable with respect to the body, and when the second end of the cap is spaced from the body, the cap is in an opened position. Once the cap is rotated towards the body, such as in a clock-wise direction (or counter-clockwise direction depending on the relative position of the user rotating the cap), the locking bar abuts against the opposing side walls of the body. Specifically, as the locking bar of the cap is rotated towards the body, the locking bar may contact the top surface of the opposing side walls. In order to force the locking bar into the side wall grooves, an elastic force, which deflects the spring of the cap, may be necessary. During application of the elastic force, the spring will deform to have a reduced longitudinal dimension, thereby permitting the locking bar to enter into the side wall grooves.

When the cap is in its closed position against the hook arm adapter body, the concave portion of the spring surrounds the hole of the body for receiving a wiper arm. That is, the spring has a concave portion so as not to block the hole of the body for receive the wiper arm. In the closed position, the locking bar may be locked against the side wall grooves of the body.

Specifically, during the application of the elastic force, the concave portion will elastically deform to have a reduced radius of curvature. Further, during the elastic deformation, the entirety of the spring, including the convex portion and the concave portion, may deflect to allow the locking bar to enter into the side wall grooves.

The body is sized any shaped to receive a hook-type wiper arm in a direction from the second end of the body to the first end of the body. U.S. Pat. No. 9,650,017, herein "Lee" is incorporated by reference in its entirety, discloses an adapter including "a hooking portion adapter to selectively receive a left hand drive hook or a right hand drive hook of a wiper arm, the hooking portion including a body formed of side plates that are parallel to each other and a connector extending between the side plates such that the side plates extend above and below the connector" (Lee Abstract and FIG. 2).

To install a hook-type wiper arm, the hook portion of the hook-type wiper arm is introduced into the channel defined by the opposing side walls of the body when the cap is in the open position (i.e., the second end of the cap is spaced from the body), and engages the body. For instance, the hook portion may engage a hooking portion adapter, as described in Lee above. Thereafter, the cap is rotated towards to body, such as in a clock-wise direction, until the locking bar contacts the top surfaces the opposing side walls, adjacent to the side wall grooves. The cap is then pushed to elastically deform the spring, thereby forcing the locking bar into the side wall grooves. Once the locking bar is forced into the side wall grooves, the spring simultaneously forces the locking bar against the side wall grooves to fix the cap to the body, and the spring abuts against the wiper arm to lock the wiper arm to the adapter.

The adapter may be comprised of any known material, but is preferably plastic due to its weather resistance, light weight, and relatively low cost.

The adapter of the present invention is simpler to manufacture than the adapters of the prior art and is securely fixed various types wiper arms, to secure a wiper blade to the corresponding wiper arm. The wiper arm may include a hook-type wiper arm or a pin-type wiper arm.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The adapter 200 of the present invention may be used on any type of wiper hook arm, including a pin-type wiper arm, a hook-type wiper arm. For instance, the adapter 200 of the present invention can be used to connect 9×3 mm and 9×4 mm automotive wiper hook arm to a wiper blade, and allow the wiper blade to rotate on the arm.

Figure 1:
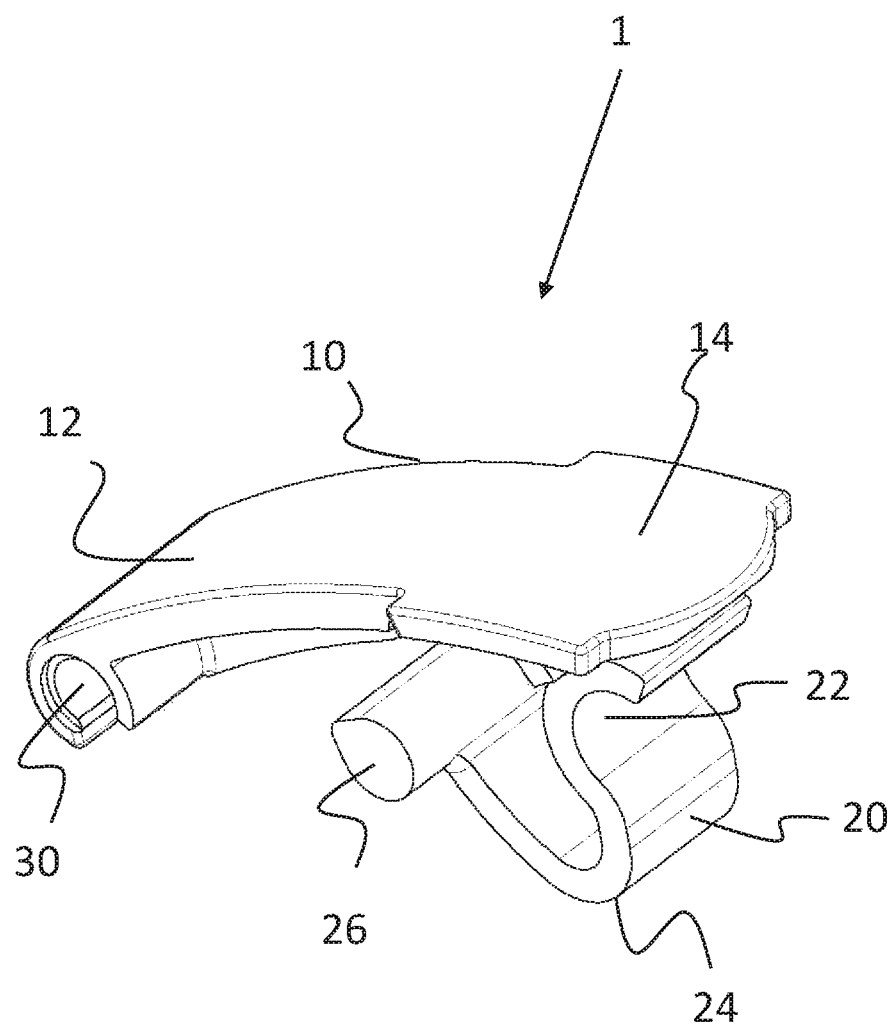
FIG. 1 is a perspective view of the adapter cap according to the present invention.

FIG. 1 is a perspective view of the adapter cap 1 of an adapter 200 according to the present invention. The adapter cap 1 includes a top surface 10 having a first end and a second end. The top surface 10 of the adapter cap 1 includes a first portion 12 at the first end and a second portion 14 at the second end. The second portion 14 of the adapter cap may be wider than the first portion 12 of the adapter cap 1.

The adapter cap 1 may further include a spring 20 extending from the second end of the adapter cap 1, and from the second portion 14 of the adapter cap 1. The spring 20 may be elastic and may have a wavy shape, which may include an S-shape. The spring 20 may include a convex portion 22, which may have a convex shape extending from the second portion 14 of the adapter cap 1, and a concave portion 24, which may have a concave shape. The concave portion 24 may extend from the convex portion 22.

Figure 4:
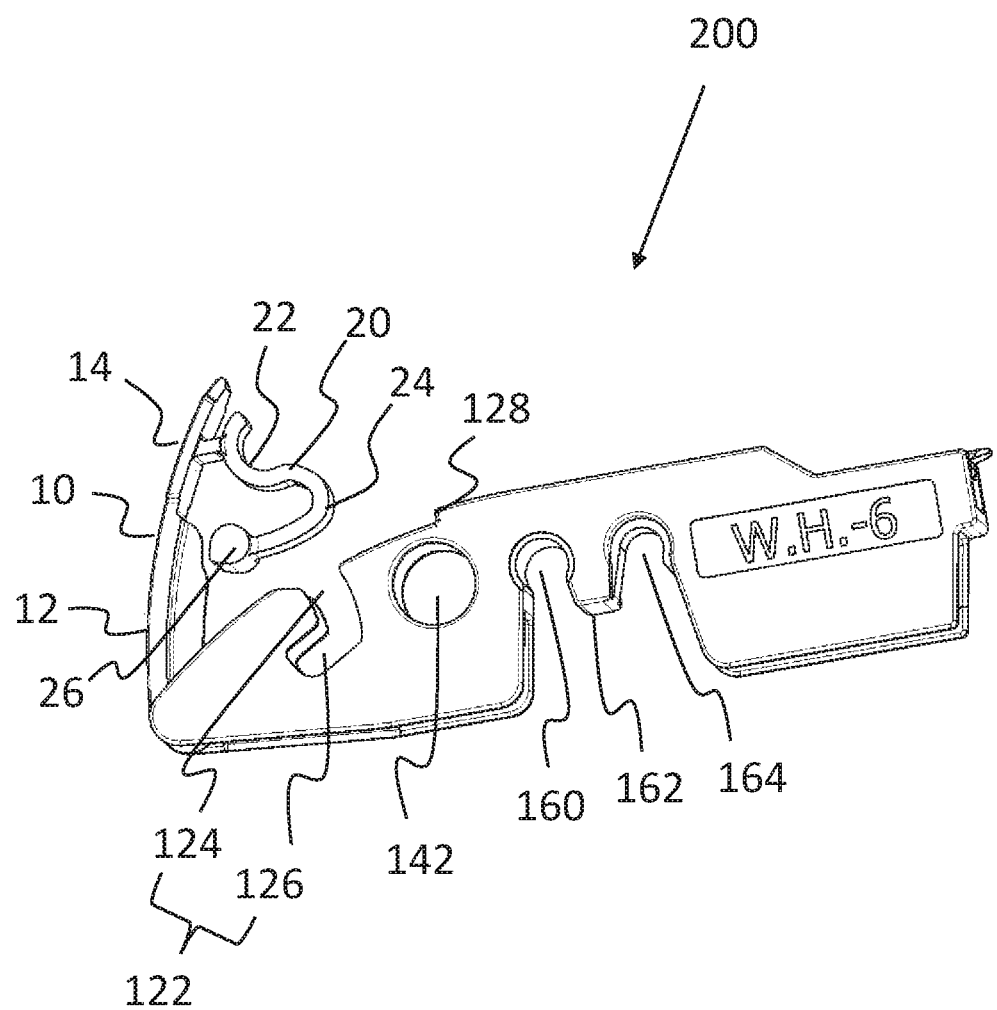
FIG. 4 is side perspective view of the adapter cap of FIG. 1 attached to the hook arm adapter body of FIG. 2, with the adapter cap being an open position.
Figure 5:
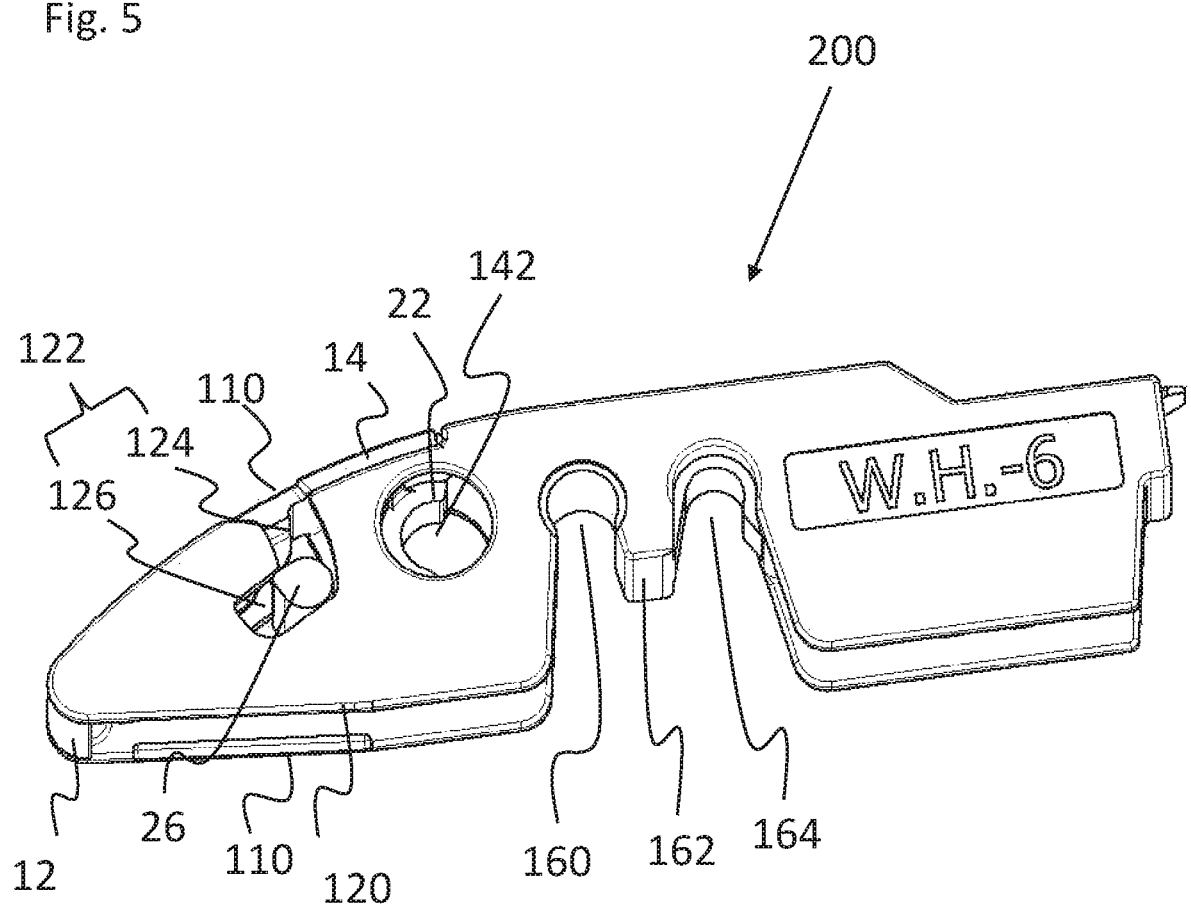
FIG. 5 is a side perspective view of the adapter cap of FIG. 1 attached to the hook arm adapter body of FIG. 2, with the adapter cap being in a closed position.
Figure 6:
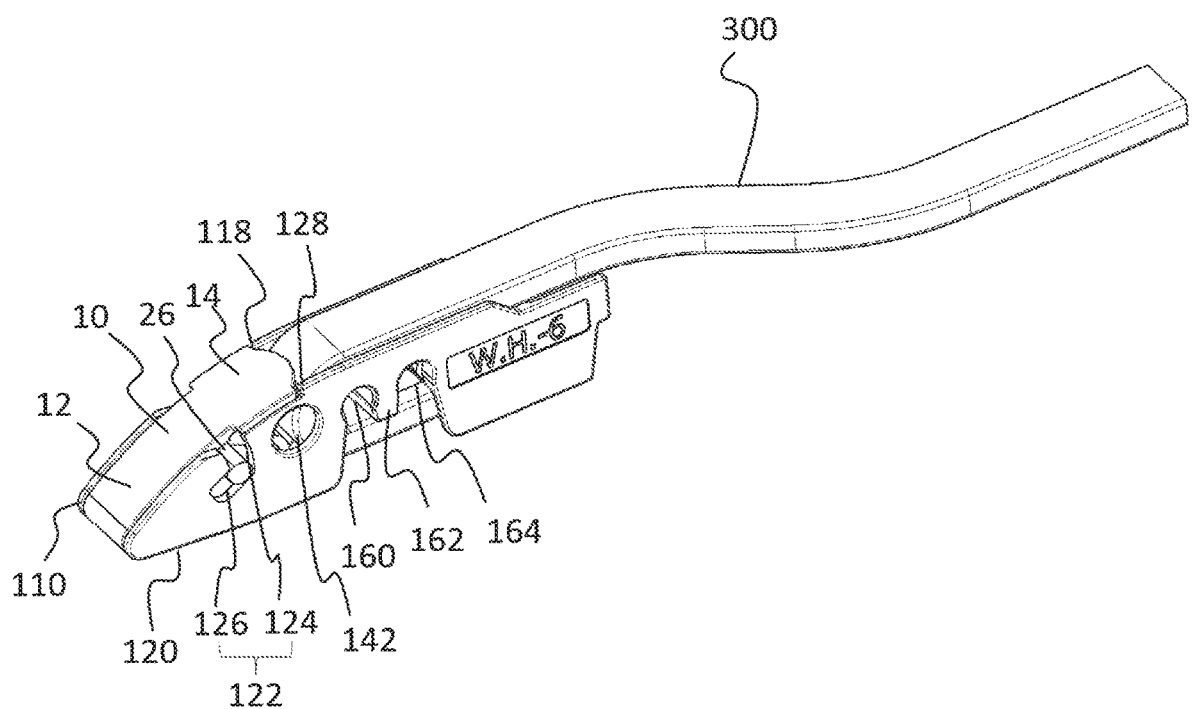
FIG. 6 is a perspective view of a wiper hook arm attached to a hook arm adapter of the present invention.

The spring 20 may further include a locking bar 26 extending from the concave portion 24. The locking bar 26 may be an end of the spring 20. The locking bar 26 may have an oval shape or a substantially oval shape or any other shape. For instance, the locking bar 26 may have a circular cross-section, a rectangular cross-section or a semi-circular cross-section. The locking bar 26 may be provided at an end of the concave portion 24. The locking bar 26 may engage a groove 112, 122 of the hook arm adapter body 100, hereinafter "body," as illustrated in FIGS. 4-6. The locking bar 26 may have a greater width than a width of the convex portion 22 and the concave portion 24 of the spring 20.

The adapter cap 1 may further include a cap groove 30 at the first end of the adapter cap 1. The cap groove 30 may have a circular shape, or a substantially circular shape. The cap groove 30 may be opened to engage a body pin 130 of the body 100, as shown in FIGS. 4-6. The cap groove 30 may be elastically engage to (i.e., be elastically connected to) the body pin 130 of the body 100.

The cap groove 30 may have a smaller opening than the body pin 130, such that an elastic force may be necessary to attach the cap groove 30 to the body pin 130. Once the adapter cap 1 and the body 100 are attached via the connection between the cap groove 30 and the body pin 130, the adapter cap 1 and the body 100 may be movable with respect to one another. That is, the adapter cap 1 may be rotatable (i.e., hingedly) connected with respect to the body 100 by the connection between the adapter cap groove 30 and the body pin 130. For instance, the cap groove 30 may be slightly larger than the body pin 130 to allow for relative movement between the adapter cap 1 and the body 100.

Figure 2:
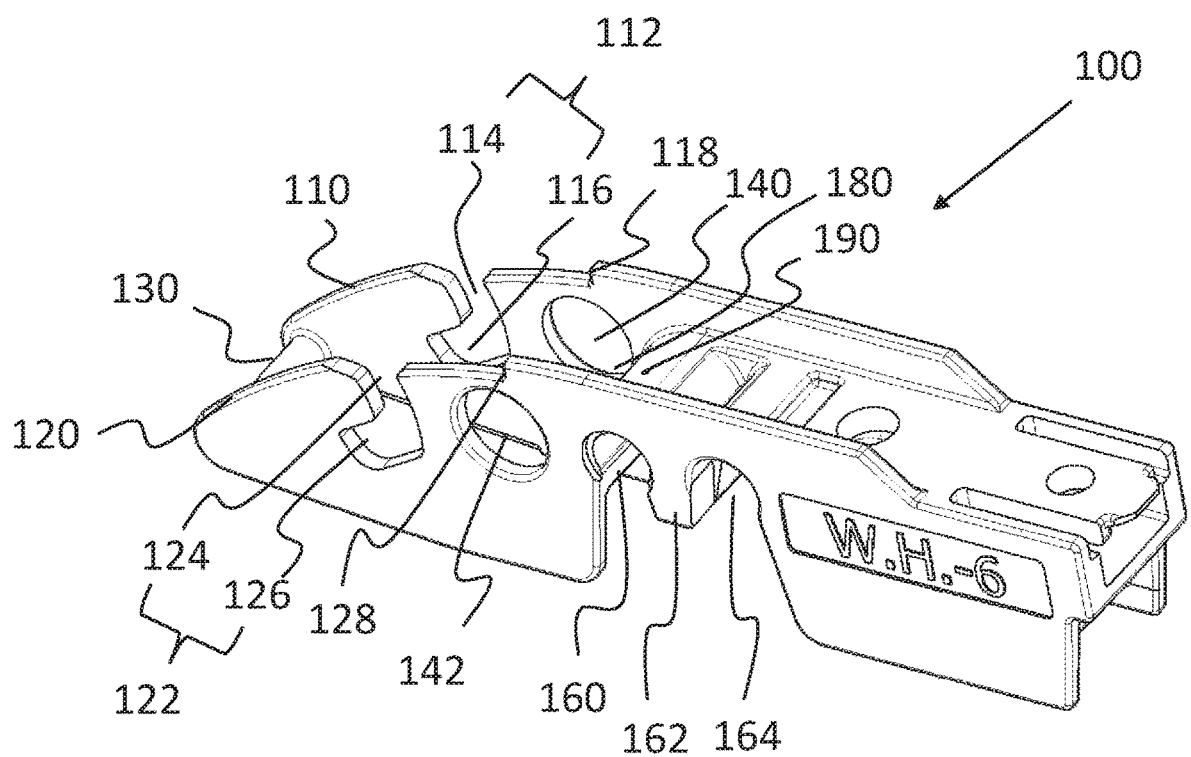
FIG. 2 is a perspective view of the hook arm adapter body according to the present invention.

FIG. 2 illustrates a perspective view of the body 100 of the adapter 200. The body 100 may include two opposing side walls 110, 120 at a first end thereof, each opposing side wall 110, 120 including a hole 140, 142 for receiving a wiper arm having a pin arm (i.e., a pin-type wiper arm) and a side wall groove 112, 122 for receiving the locking bar 26 of the spring 20.

That is, the body 100 may include a first side wall 110 and a second side wall 120. The first side wall 110 may include a hole 140 for receiving a pin-type wiper arm. The first side wall 110 may further include a first side wall groove 112 for receiving the locking bar 26 of the spring 20. The first side wall groove 112 of the first side wall 110 may include a first groove portion 114 extending from a top surface of the first side wall 110 and a second groove portion 116 extending from the first groove portion 114. The first groove portion 114 may extend in a first direction and the second groove portion 116 may extend in a second direction, and the second direction may be different from the first direction. Further, the first direction may be at an obtuse angle with respect to the second direction, or the first direction may be any angle with respect to the second direction to allow for the locking bar 26 to be fixedly connected to the first groove portion 114 or the second groove portion 116.

The second side wall 120 may include a hole 142 for receiving a pin-type wiper arm. The second side wall 120 may further include a second side wall groove 122 for receiving the locking bar 26 of the spring 20. The second side wall groove 122 of the second side wall 120 may include a first groove portion 124 extending from a top surface of the second side wall 120 and a second groove portion 126 extending from the first groove portion 124. The first groove portion 124 may extend in a first direction and the second groove portion 126 may extend in a second direction, and the second direction may be different from the first direction. Further, the first direction may be at an obtuse angle with respect to the second direction, or the first direction may be any angle with respect to the second direction to allow for the locking bar 26 to be fixedly connected to the first groove portion 124 or the second groove portion 126.

The first side wall groove 112 and the second side wall groove 122 may have any shape so as to retain the locking bar 26 of the adapter cap 1. For instance, the first side wall groove 112 and the second side wall groove 122 may be slightly wider than the locking bar 26 to allow the locking bar 26 to be received therein. In other words, the first side wall groove 112 and the second side wall groove 122 are sized to receive the locking bar and may have any shape, such as an "L" shape. Further, the second groove portion 116, 126 of the first side wall 110 and the second side wall 120 may extend in the second direction towards the body pin 130.

The first side wall 110 may further include a lip 118 (i.e., raised portion) for engaging the second portion 14 of the top surface 10 of the adapter cap 1. That is, when the adapter cap 1 is in its closed (i.e., fully installed) position engaging the body 100, the second portion 14 of the top surface 10 of the adapter cap 1 may abut against the lip 118 of the first side wall 110 to secure the adapter cap 1 in place, or may be slightly spaced from the lip 118 of the first side wall 110.

Further, the second side wall 120 may further include a lip 128 (i.e., raised portion) for engaging the second portion 14 of the adapter cap 1. That is, when the adapter cap 1 is in its closed (i.e., fully installed) position engaging the body 100, the second portion 14 of the adapter cap 1 may abut against the lip 128 of the second side wall 120 to secure the adapter cap 1 in place, or may be slightly spaced from the lip 128 of the second side wall 120.

Further, when the adapter cap 1 is in its closed position engaging the body 100, the second portion 14 of the adapter cap 1 may further abut against a top surface of the first side wall 110 and a top surface of the second side wall 120. The second portion 14 of the adapter cap 1 may have the same width as body 100 to extend completely between the first side wall 110 and the second side wall 120. That is, the second portion 14 of the adapter cap 1 may extend an entire width of the body 100.

In other words, once the adapter 1 is installed on the body 100, as shown in FIGS. 5 and 6, the adapter cap 1 may not extend outwardly, in a width direction, from the first side wall 110 and the second side wall 120. Further, once the adapter cap 1 is installed on the body 100, the first portion 12 may be provided in between the first side wall 110 and the second side wall 120. However, the adapter cap 1 may be sized to extend outwardly, in a width direction, of the first side wall 110 and the second side wall 120.

Further, the second portion 14 of the adapter cap 1 may be flush (i.e., have the same height) with a top surface of the lip 118 of the first side wall 110 and a top surface of the lip 128 of the second side wall 120, as shown in FIGS. 5 and 6.

Further, the body pin 130 extends between the first side wall 110 and the second side wall 120 for receiving the cap groove 30 of the adapter cap 1. The first side wall 110 and the second side wall 120 may define a channel 180 for receiving a hook portion of a hook-type wiper arm 300, as shown in FIG. 6, as known in the art. For example, U.S. Pat. No. 5,289,608, herein "Kim" discloses the connection between a hook arm 21 of a hook-type wiper arm 11 to a wiper arm adapter 10 in FIGS. 1 and 2, and Kim is incorporated by reference in its entirety.

The body 100 may further include a first slot 160, a second slot 164 and a protrusion 162 between the first slot 160 and the second slot 164. The first slot 160 may be for rotatably mounting the body 100 to a transverse pin of a bridge member of a blade unit, as known in the art. Further, the second slot 164 may be for rotatably receiving a rolled bushing of a pin type wiper arm. The first slot 160 and the second slot 64 may be provided substantially at a center of the body 1. Further, the first slot and the second slot may be defined by the protrusion 162 (i.e., a connector or central bridge). For instance, the protrusion 162 may optionally be provided and may be provided between the first slot 160 and the second slot 164 to separate the first slot 160 from the second slot 164. Further, the protrusion 162 may extend downwardly and separate the first slot 160 from the second slot 164.

Figure 3:
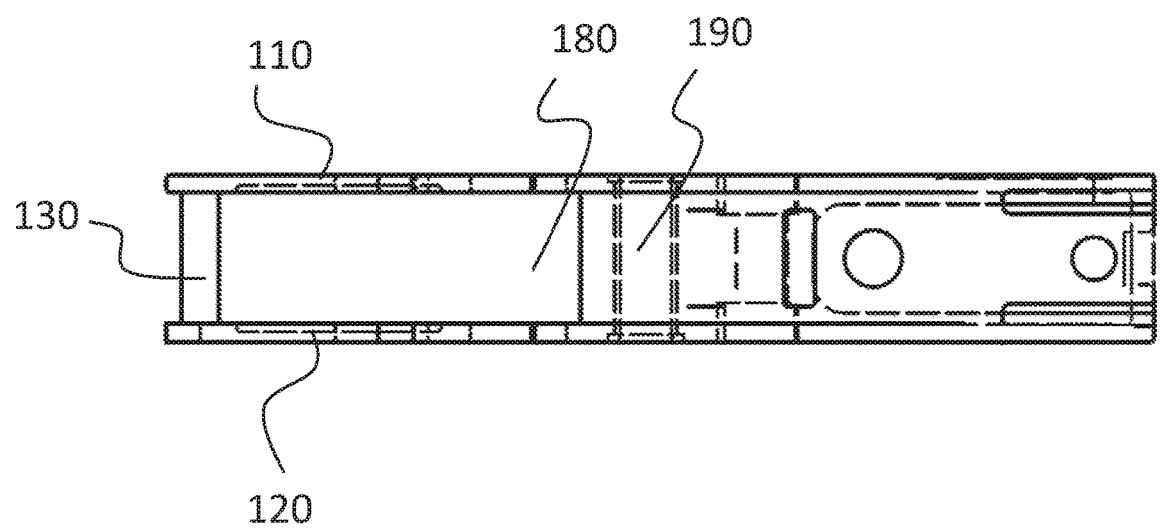
FIG. 3 is a top view of the hook arm adapter body of FIG. 2.

FIG. 3 is a top view of the body 100 of FIG. 2. The body pin 130 extends between the first side wall 110 and the second side wall 120. Further, the body 100 may include a channel 180 between the first side wall 100 and the second side wall 120 for receiving a hook portion of a wiper arm 200, as shown in FIG. 6. Further, the hook portion of the wiper arm may rest against a body main portion 190.

FIG. 4 is a side perspective view of the adapter 200 with the adapter cap 1 of FIG. 1 partially assembled to the body 100 of FIG. 2 (i.e., in a partially assembled state or opened state). That is, FIG. 4 illustrates the cap groove 30 of the adapter cap 1 being attached to the body pin 130 of the body 100. As discussed above, the body pin 130 may be rotatably attached to the cap groove 30 to allow for the adapter cap 1 to be rotatable with respect to the body 100.

FIG. 4 is perspective view of the second side wall 120. That is, FIG. 4 illustrates the second side wall 120 including the second side wall groove 122 having a first groove portion 124 and second groove portion 126. Further, FIG. 4 illustrates the body 100 having the first slot 160, the second slot 164, and the protrusion 162 between the first slot 160 and the second slot 164.

In opened state of the adapter 200, a hook portion of a wiper arm may be installed to the adapter 200 by entering into the channel 180 of the body 100 defined by a space between the first side wall 110 and the second side wall 120, to engage with the body main portion 190 (i.e., hooking portion adapter) of the body 100. Further, in the opened state of the adapter 200, the spring 20 is in an un-deflected (i.e., non-deformed) state and does not engage the body 100, and the second end 14 of the adapter cap 1 is spaced from the first side wall 110 and is spaced from the second side wall 120.

FIG. 5 illustrates a perspective view of the adapter 200 with the adapter cap 1 in its fully closed (i.e., fully seated or fully assembled) state against the body 100. The locking bar 26 is shown partially received in the second groove portion 116 of the first side wall 110 and partially received in the second groove portion 126 of the second side wall 120. However, the locking bar 26 may be at any position within the first groove portion 114, 124 of the first side wall 110 and the second side wall 120, or any position with the second groove portion 116, 126 of the first side wall 110 and the second side wall 120.

In the transition between the open position of the adapter cap 1, as shown in FIG. 4, to the closed position of the adapter cap 1, as shown in FIG. 5, the adapter cap 1 is rotated towards the body 100, and may be rotated in a clock-wise direction, and the locking bar 26 contacts a top surface of the first side wall 110 and a top surface of the second side wall 120. In order to force the locking bar 26 into the first side wall groove 112 and the second side wall groove 122, an elastic force, which deflects the spring 20 of the adapter cap 1, may be necessary. During application of the elastic force, the spring 20 will deform to have a reduced longitudinal dimension, thereby permitting the locking bar 26 to enter into the first side wall groove 112 and the second side wall groove 122. The reduced longitudinal dimension may involve deformation of the convex portion 22 and deformation of the concave portion 24. Further, as shown in FIG. 5, the locking bar 26 may enter and be locked to the second groove portion 116, 126 of the first side wall groove and the second side wall groove to lock a wiper arm in place and to lock the adapter cap 1 to the body 100.

Further, when the adapter cap 1 is in its closed position against the adapter body 100, the concave portion 22 of the spring 20 may surround the hole 140, 142 of the first side wall 110 and the second side wall 120 of body 100 for receiving a pin-type wiper arm. That is, the spring 20 has a concave portion 22 so as not to block the hole 140, 142 of the first side wall 110 and the second side wall 120 of body for receiving a pin-type wiper arm.

FIG. 6 is a perspective view of a wiper hook arm 300 being attached to a hook arm adapter 200 of the present invention. As described above, the wiper hook arm 300 is installed when the adapter cap 1 is in its open position, the open position is shown in FIG. 4. After the wiper hook arm 300 is installed to body 100, the adapter cap 1 is rotated. As the adapter cap 1 rotates, the locking bar 26 first contacts a top surface of the first side wall 110 and a top surface of the second side wall 120 and the spring 20 elastically deforms.

As the spring 20 deforms, the locking bar 26 engages the first groove portion 114, 124 of the first side wall 110 and the second side wall 120, which causes the spring 20 to further elastically deform and the locking bar 26 progresses into the first groove portion 114, 124 of the first side wall 110 and the second side wall 120. As the adapter cap 1 continues to rotate towards the closed position, the locking bar 26 continues to elastically deform to progress past the first groove portion 114, 124 of the first side wall 110 and the second side wall 120 and into the second groove portion 116, 126 of the first side wall 110 and the second side wall 120, until it is in its fully closed (i.e., fully seated) position, as shown in FIG. 6.

Specifically, during the application of the elastic force, the concave portion 22 will elastically deform to have a reduced radius of curvature. Further, during the elastic deformation, the entirety of the spring 20, including the convex portion 20, may deflect to allow the locking bar 26 to enter into the first side wall groove 112 and the second side wall groove 122.

Once the locking bar 26 is forced into the first side wall groove 112 and the second side wall groove 122 into its closed (i.e., final) position, the locking bar 26 is locked against the second groove portion 116, 126 of the first side wall 110 and the second side wall 120 to lock the wiper hook arm 300 in place. The spring 20 may abut against the wiper hook arm 300 to lock the wiper arm 300 to the adapter 200.

In its fully closed position, the top surface 10 of the adapter cap 1 engages the first side wall 110 and the second side wall 120, and the first portion 12 of the top surface 10 sits within the channel 180 defined by the first side wall 110 and the second side wall 120.

That is, the second portion 14 of the top surface 10 of the adapter cap 1 may rest (i.e., abut) against a top surface of the first side wall 110 and a top surface of the second side wall 120 and the second portion 14 be flush with the lip 118 of the first side wall 110 and may be flush with the lip 128 of the second side wall 120.

Further, the second portion 14 of the top surface 10 of the adapter cap 1 may be spaced apart or may engage the lip 118 of the first side wall 110 and the lip 128 of the second side wall 120.

To remove the wiper hook arm 300 from the adapter 200, the adapter cap 1 is rotated from the closed position to the open position, the direction of rotation may be a counter-clockwise direction. During rotation of the adapter cap 1 from the closed position to the open position, the spring 20 acts as an extension spring that stretches to allow the locking bar 26 to follow the first side wall groove 112 and the second side wall groove 122 upward to release the adapter cap 1 from the body 100.

For instance, when the locking bar 26, in the closed position of the adapter cap 1, is locked against the second groove portion 116, 126 of the first side wall 110 and the second side wall 120, rotation of the adapter cap 1 in the counter-clockwise direction first causes the locking bar 26 move from the second groove portion 116, 126 of the first side wall 110 and the second side wall 120 to the first groove portion 114, 124 of the first side wall 110 and the second side wall 120, and then to exit from the first groove portion 114, 124 of the first side wall 110 and the second side wall 120.

Once the adapter cap 1 is rotated to its open position, the hook-type wiper arm 300 may be removed from the adapter 200, to allow for replacement of a wiper blade.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wiper blade adapter, comprising:
a body configured to receive a hook-type wiper arm; and
a cap configured to lock the hook-type wiper arm to the adapter,
wherein a first end of the cap is hingedly connected to a body pin of the body, and a second end of the cap engages a groove of the body to lock the cap to the body and to lock the hook-type wiper arm to the adapter,
wherein the groove of the body includes:
a first groove portion extending from a top surface of the body in a first direction; and
a second groove portion extending from the first groove portion in a second direction, the second direction being different from the first direction, and
wherein the cap comprises:
a cap groove at the first end of the cap hingedly and removably connected to the body pin of the body; and
a spring extending from the second end of the cap.

2. The wiper blade adapter of claim 1, wherein the spring includes a first end and a second end, the first end of the spring being connected to the second end of the cap,
wherein the second end of the spring includes a locking bar, and
wherein the locking bar engages the groove of the body to lock the cap to the body and to lock the hook-type wiper arm to the adapter.

3. The wiper blade adapter of claim 2,
wherein the locking bar is configured to, when moved from an open position spaced from the body to a closed position engaging the body, engage the second groove portion.

4. The wiper blade adapter of claim 2, wherein the body includes a first side wall and a second side wall, the first side wall being parallel to the second side wall,
wherein the first side wall includes a first side wall groove and the second side wall includes a second side wall groove, and
wherein the groove of the body includes the first sidewall groove and the second side wall groove.

5. The wiper blade adapter of claim 4, wherein each of the first side wall groove and the second side wall groove includes:
a first groove portion extending from a top surface of the body in a first direction; and
a second groove portion extending from the first groove portion in a second direction, the second direction being different from the first direction, and
wherein the locking bar is configured to, when moved from an open position spaced from the body to a closed position engaging the body, engage the second groove portion of the first side wall groove and the second side wall groove.

6. The wiper blade adapter of claim 2, wherein the spring includes:
a convex portion extending from the first end of the spring; and
a concave portion extending from the convex portion, and
wherein the locking bar extends from the concave portion.

7. The wiper blade adapter of claim 6, wherein the body includes a first hole for receiving a pin-type wiper arm, and
wherein the convex portion of the spring surrounds the first hole of the body when the cap is locked against the body.

8. The wiper blade adapter of claim 1, wherein the body includes a first side wall and a second side wall, the first side wall being parallel to the second side wall, wherein the cap includes a top surface having a first portion extending from the first end of the cap and a second portion extending from the first portion to the second end of the cap, and wherein the first portion has a width smaller than a width of the second portion.

9. The wiper blade adapter of claim 8, wherein when the cap is in a closed position engaging the body, the first portion of the cap is located between the first side wall and the second side wall and the second portion of the cap is located on a top surface of the first side wall and a top surface of the second side wall.

10. A wiper blade adapter, comprising:
a body configured to receive a hook-type wiper arm, the body including a body pin;
a cap configured to lock the hook-type wiper arm to the adapter, the cap including:
a cap groove at a first end of the cap hingedly and removably connected to the body pin of the body; and
a spring extending from a second end of the cap, the first end of the cap being opposite to the second end of the cap,
wherein the spring includes a first end connected to the second end of the cap and a second end,
wherein the second end of the spring includes a locking bar, and
wherein locking bar engages a groove of the body in a closed position to lock the cap to the body and to lock the hook-type wiper arm to the adapter.

11. The wiper blade adapter of claim 10, wherein the spring includes:
a convex portion extending from the first end of the spring; and
a concave portion extending from the convex portion, and
wherein the locking bar extends from the concave portion.

12. The wiper blade adapter of claim 10, wherein the groove of the body includes:
a first groove portion extending from a top surface of the body in a first direction; and
a second groove portion extending from the first groove portion in a second direction, the second direction being different from the first direction, and
wherein the locking bar is configured to, when moved from an open position spaced from the body to the closed position, engage the first groove portion and the second groove portion.

13. The wiper blade adapter of claim 10, wherein the body includes a first side wall and a second side wall, the first side wall being parallel to the second side wall,
wherein the first side wall includes a first side wall groove and the second side wall includes a second side wall groove,
wherein the groove of the body includes the first sidewall groove and the second side wall groove, and
wherein the locking bar engages the first sidewall groove and the second side wall groove in the closed position.

14. The wiper blade adapter of claim 13, wherein each of the first side wall groove and the second side wall groove includes:
a first groove portion extending from a top surface of the body in a first direction; and
a second groove portion extending from the first groove portion in a second direction, the second direction being different from the first direction, and
wherein the locking bar is configured to, when moved from an open position spaced from the body to the closed position, engage the first groove portion and the second groove portion of the first side wall groove and the second side wall groove.

15. The wiper blade adapter of claim 10, wherein the spring includes:
a convex portion extending from the second end of the cap; and
a concave portion extending from the convex portion, and
wherein the locking bar extends from the concave portion.

16. The wiper blade adapter of claim 10, wherein the body includes a first side wall and a second side wall, the first side wall being parallel to the second side wall,
wherein the cap includes a top surface having a first portion extending from the first end of the cap and a second portion extending from the first portion to the second end of the cap, and
wherein in the closed position, the first portion of the cap is located between the first side wall and the second side wall and the second portion of the cap is located on a top surface of the first side wall and a top surface of the second side wall.

17. A method of assembling a hook-type wiper arm to a wiper blade adapter, comprising:
providing the wiper blade adapter, the wiper blade adapter including:
a body including:
a first side wall having a first side wall groove;
a second side wall having a second side wall groove; and
a pin extending from the first side wall to the second side wall; and
a cap having a first end and a second end, the cap including:
a cap groove at the first end; and
a spring at the second end, the spring including a locking bar;
elastically connecting the cap groove of the cap to the pin of the body;
assembling the hook-type wiper arm to the body with the cap being in an open position, wherein in the open position, the second end of the cap is spaced from the body; and
rotating the cap with respect to the body to a closed position, wherein in the closed position, the locking bar is locked against the first side wall groove and the second side wall groove.

18. The method according to claim 17, wherein each of the first side wall groove and the second side wall groove includes:
a first groove portion extending from a top surface of the body in a first direction; and
a second groove portion extending from the first groove portion in a second direction, the second direction being different from the first direction, and
wherein the step of rotating the cap with respect to the body to the closed position includes rotating the cap to cause the spring to elastically deform until the locking bar engages the second groove portion of the first side wall groove and the second groove portion of the second side wall groove.

19. The method according to claim 17, wherein the cap includes a top surface having a first portion extending from the first end of the cap and a second portion extending from the first portion to the second end of the cap,
wherein the first portion has a width smaller than a width of the second portion, and wherein in the closed position, the first portion of the cap is located between the first side wall and the second side wall and the second portion of the cap is located on the top surface of the first side wall and a top surface of the second side wall.

* * * * *